July 1, 1930.   C. E. VAN ORSTRAND   1,768,809
APPARATUS FOR MEASURING DEPTHS OF WELLS
Filed Nov. 21, 1927   2 Sheets-Sheet 1

July 1, 1930. C. E. VAN ORSTRAND 1,768,809
APPARATUS FOR MEASURING DEPTHS OF WELLS
Filed Nov. 21, 1927  2 Sheets-Sheet 2
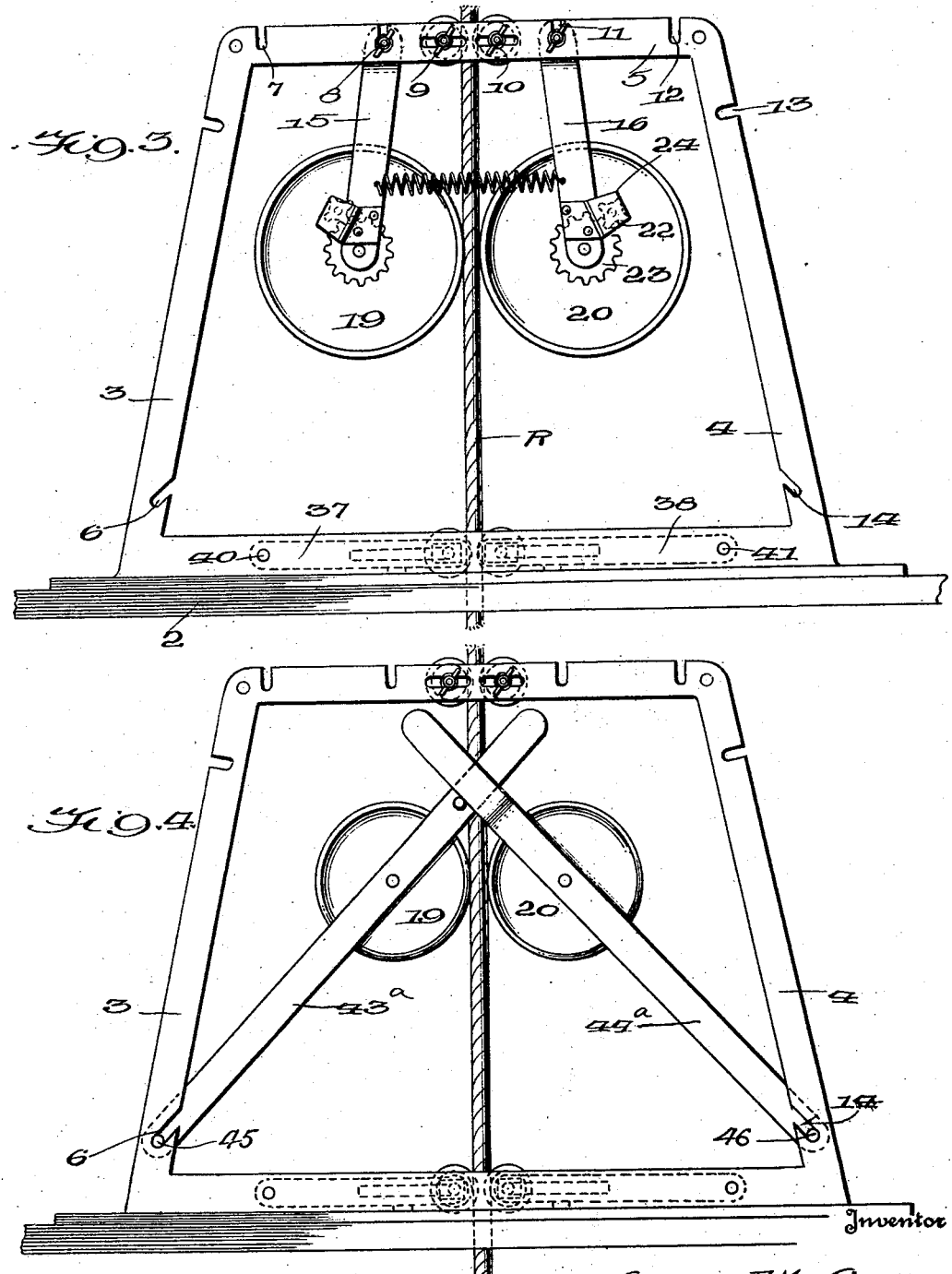
Inventor
CHARLES E. VAN ORSTRAND
By Chas. Silver
Attorney Patented July 1, 1930

1,768,809

UNITED STATES PATENT OFFICE

CHARLES E. VAN ORSTRAND, OF WASHINGTON, DISTRICT OF COLUMBIA

APPARATUS FOR MEASURING DEPTHS OF WELLS

Application filed November 21, 1927. Serial No. 234,820.

This invention relates to devices for measuring depths of wells, such as oil, gas, artesian, and the like.

In the fields of science and engineering and in conducting oil-well drillings, it has been found very important and desirable to obtain accurate measurements of depths not only for calculating costs, but also for obtaining reliable data on the depths of the various strata of the earth through which the drilling is carried out. This latter information, if accurate, may be appropriated to very great advantage in blasting operations and also in ascertaining the general direction of the domes and troughs, and the synclines and anticlines of the geologic formations. These depth measurements can be relied on only if they are accurate, and the maximum error of measurement must be reduced to a minimum, preferably to less than one foot in a depth measurement of 2,000 feet or more. The devices heretofore employed for this purpose have been very inefficient, the measurements being often as much as fifty feet or more in error.

The chief sources of error in making depth measurements of oil wells are the longitudinal and transverse vibrations of the cable. Longitudinal vibrations are caused chiefly by the slipping of the coil of the cable on the reel, while the transverse vibrations are the result of periodic impulses transmitted from the cable to the engine or other parts of the oil-well machinery. Adhesion of the cable to the wall of the well and release from same produce a combination of longitudinal and transverse vibrations that may be quite serious. The devices heretofore employed for measuring the depth of wells are quite generally of the rigid type, while in my depth measuring device, flexibility is a predominant characteristic, and the fundamental requirements of stability and equalized symmetrical distribution of the load on the cable is obtained.

Among the objects of this invention is the provision of an apparatus whereby measurements of high precision may be obtained and whereby accurate results may be obtained when the measuring is intrusted to unskilled labor. A further object of this invention is to provide a device whereby accurate measurements may be performed in a short space of time and requiring substantially a minimum of labor and attention on the part of the operator. A still further object of this invention is to provide means for obtaining accurate measurements when the cable is subject to vibrations as it is lowered into or raised from the well, the means being easily brought to the sand-line and so positioned as not to interfere with the well drilling operations.

Other further and more specific objects of the invention will become readily apparent to persons skilled in the art from a consideration of the following description when taken in conjunction with the drawings, wherein:

Fig. 1 is a perspective view showing my depth measuring device in operation.

Fig. 2 is a side elevation of my device illustrating the operative relation of the rollers and their supporting arms when the latter are in crossed position.

Fig. 3 is a view similar to Fig. 1 with the supporting arms in open position.

Fig. 4 is a side elevation of my device, illustrating the use of supporting arms adapted to swing above the point of support.

Referring to Figs. 1 and 3, the apparatus comprises a supporting base, preferably of cast metal, such as cast iron, and having the plate (2) from which two pair of uprights (3) and (4) extend. These uprights (3) and (4) are connected by the horizontal members (5). The uprights (3) and (4) and the horizontal members (5) contain the open slots or perforations (6), (7), (8), (9), (10), (11), (12), (13), and (14), the perforations in one of the pair of uprights and horizontal members being in alinement with those in the other. The slots 8 and 11 receive the shafts that carry the swinging arms which support the friction rolls engaging the cable or rope R. In Fig. 1, the swinging arms (15) and (16) are hung from the shafts (17) and (18) journalled in the slots (8) and (11), respectively. With the arms or links (15) and (16) in the open position shown in Figs. 1 and 3, it is very desirable to have the distance between the slots (8) and (11) less than the sum of the radii of the two friction wheels (19) and (20), as this condition tends to bring the wheels (19) and (20) together under the influence of gravity. As a further assurance of having the wheels (19) and (20) together, a spring (21) connects the arms (15) and (16).

The wheels (19) and (20) are supported by the arms (15) and (16). The wheel (20) actuates the registering mechanism (22) by means of the gear (23) upon the wheel meshing with the pinion (24) operating the register or counter. If desired, a similar registering mechanism may be provided for the wheel (21) to serve as a check for the register (22), or to be used in the event of the counter upon the wheel (20) becoming unserviceable. The wheels (19) and (20) are provided with wide, flat faces (25) and (26), respectively. These faces are hardened so as to minimize wear as much as possible. I have found case hardened iron to be suitable for this purpose. The faces of the wheels (19) and (20) may also be of case hardened steel and under certain conditions of carborundum or corundum. By making the faces wide, local wearing tending to form objectionable grooves is considerably reduced.

My new depth-measuring device is also provided with the guide-rollers (27) and (28) supported by shafts journalled in the perforations (9) and (10) of the horizontal members (5), and the lower guide-rollers (29) and (30) at the base and supported by the shafts (31) and (32), respectively. I prefer to have the support for the rollers (29) and (30) yielding, and as shown in Fig. 1, the shafts (31) and (32) may be made to yield against the tension of the springs (34) and (35), and if desired the rollers (27) and (28) may also be mounted for yielding by providing a construction similar to that for the rollers 29 and 30. This yielding construction allows the rollers to spread apart when the rope or cable having an enlarged portion is passed between the rollers, and may be found advantageous where cables which are spliced are used. However, the yielding construction is not indispensable. One or more of the guide rollers may be provided with end flanges (36), as shown on roller (30). This arrangement limits the side-wise movement of the rope or cable R and prevents it from striking the supporting frame.

Also, I prefer to employ the arms (37) and (38) for carrying the guide-rollers (29) and (30) and which are hinged at (39) and (40), respectively, so that the guide-rollers may be swung out of position when inserting the cable or passing the bailer therebetween. The arms 37 and 38 are maintained in horizontal position by suitable locking pins 48.

In operation, the supporting base is attached by suitable means, for example spikes or bolts passing through the openings (41) and (42) into the ground or to a convenient part of the framework of the well. The cable or rope R is passed between the upper guide-rollers (27) and (28), the friction wheels (19) and (20) and the lower guide-rollers (29) and (30). As the rope or cable R is moved, its contact with the wheels (19) and (20) operates the register or counter (22), which may be adjusted to read directly the length of cable contacting the wheels (19) and (20).

In the construction shown in Fig. 2, the arms or links (43) and (44) are crossed. In this arrangement the effect of gravitation tending to keep the wheels (19) and (20) together is greater than in the open construction shown in Fig. 1, and it may be preferable under certain conditions.

In Fig. 4, I have shown how my device may be employed with the arms (43ª) and (44ª) carrying the friction wheels (19) and (20) swinging above the supporting shafts (45) and (46) journalled in the slots (6) and (14). This arrangement appears to better advantage when measuring while the cable is being lowered, while the arrangements shown in Figs. 1, 2, and 3, wherein the arms carrying the friction wheels are hung so as to swing below the supporting shafts, operate to better advantage when the measurements are made while the cable is being raised from the well. My device lends itself to ready change from one arrangement to the other.

It will be seen that the supporting frame shown in Fig. 1 may be used for the various arrangements of links or arms illustrated in Figs. 2, 3, and 4, the necessary slots for the shafts supporting the various constructions and arrangements of links being provided.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. In a depth-measuring apparatus, a supporting structure having shaft bearings for supporting hinged arms operating above said bearings and shaft bearings for supporting hinged arms operating below said latter bearings, co-operating arms having hinges for supporting said arms in said bearings and constraining said arms to substantially vertical plane movement, a flat-faced wheel on each arm, said arms being adapted to swing said wheels toward a cable and engage said cable by the flat faces of said wheels when said co-operating arms are supported in the first named bearings or when said co-operating arms are supported in the second-named bearings, and registering means on at least one of said wheels and actuated thereby.

2. In a depth-measuring apparatus, a supporting structure having shaft bearings at the bottom, side and top thereof, co-operating arms having hinges for supporting said arms in said bearings at either the bottom, side or top of said supporting structure and constraining said frames to substantially vertical plane movement, a flat-faced wheel on each arm, said arms being adapted to swing said wheels toward a cable and engage said cable by the flat faces of said wheels when said co-operating arms are supported in said bearings, and registering means on at least one of said wheels and actuated thereby.

3. In a depth-measuring apparatus, a supporting structure having shaft bearings for supporting hinged arms operating below said bearings, co-operating arms having hinges for supporting said arms in said bearings and constraining said arms to substantially vertical plane movement, a wide, flat-faced wheel on each arm, said arms being adapted to swing said wheels toward a cable and engage said cable by the flat faces of said wheels when said co-operating arms are supported in said bearings, registering means on at least one of said wheels and actuated thereby, and guide-rollers for limiting vibration of the cable while in contact with said wheels.

4. In a depth-measuring apparatus, a supporting structure having shaft bearings for supporting hinged arms operating below said bearings, co-operating arms having hinges for supporting said arms in said bearings and constraining said arms to substantially vertical plane movement, a wide, flat-faced wheel on each arm, said arms being adapted to swing said wheels toward a cable and engage said cable by the flat faces of said wheels when said co-operating arms are supported in said bearings, registering means on at least one of said wheels and actuated thereby, and resiliently supported guide-rollers for limiting vibration of the cable while in contact with said wheels.

5. In a depth-measuring apparatus, a supporting structure having shaft bearings for supporting hinged arms operating below said bearings, co-operating crossed arms having hinges for supporting said arms in said bearings and constraining said arms to substantially vertical plane movement, a wide, flat-faced wheel on each arm positioned between the intersection of the crossed arms and their free ends, said arms being adapted to swing said wheels toward a cable and engage said cable by the flat faces of said wheels when said co-operating arms are supported in said bearings, and registering means on at least one of said wheels and actuated thereby.

6. In a depth-measuring apparatus, a supporting structure having shaft bearings for supporting hinged arms operating below said bearings, co-operating crossed arms having hinges for supporting said arms in said bearings and constraining said arms to substantially vertical plane movement, a wide, flat-faced wheel on each arm positioned between the intersection of the crossed arms and their free ends, said arms being adapted to swing said wheels toward a cable and engage said cable by the flat faces of said wheels when said co-operating arms are supported in said bearings, registering means on at least one of said wheels and actuated thereby, and guide-rollers for limiting vibration of the cable while in contact with said wheels.

7. In a depth-measuring apparatus, a supporting structure having shaft bearings for supportitng hinged arms, co-operating arms having hinges for supporting said arms in said bearings and constraining said arms to substantially vertical plane movement, a wide, flat-faced wheel on each arm, said arms being adapted to swing said wheels toward a cable and engage said cable by the flat faces of said wheels when said co-operating arms are supported in said bearings, registering means on at least one of said wheels and actuated thereby, and guide-rollers for limiting vibration of the cable while in contact with said wheels, said guide-rollers being supported upon hinged arms which are adapted to swing the rollers into and out of engagement with said cable.

8. In a depth-measuring apparatus, a supporting structure having shaft bearings for supporting hinged arms, co-operating arms having hinges for supporting said arms in said bearings and constraining said arms to substantially vertical plane movement, a wide, flat-faced wheel on each arm, said arms being adapted to swing said wheels toward a cable and engage said cable by the flat faces of said wheels when said co-operating arms are supported in said bearings, registering means on at least one of said wheels and actuated thereby, and guide-rollers for limiting vibration of the cable while in contact with said wheels, said guide-rollers being supported upon hinged arms which are adapted to swing the rollers into and out of engagement with said cable, and means for locking said arms while the rollers are in guiding position for said cable.

In testimony whereof I affix my signature.

CHARLES E. VAN ORSTRAND.